May 10, 1949.    H. J. GOSS    2,469,641
METHOD OF AND MACHINE FOR MAKING
UNITARY SETUP COVERED BOXES
Filed Jan. 4, 1947    7 Sheets-Sheet 6

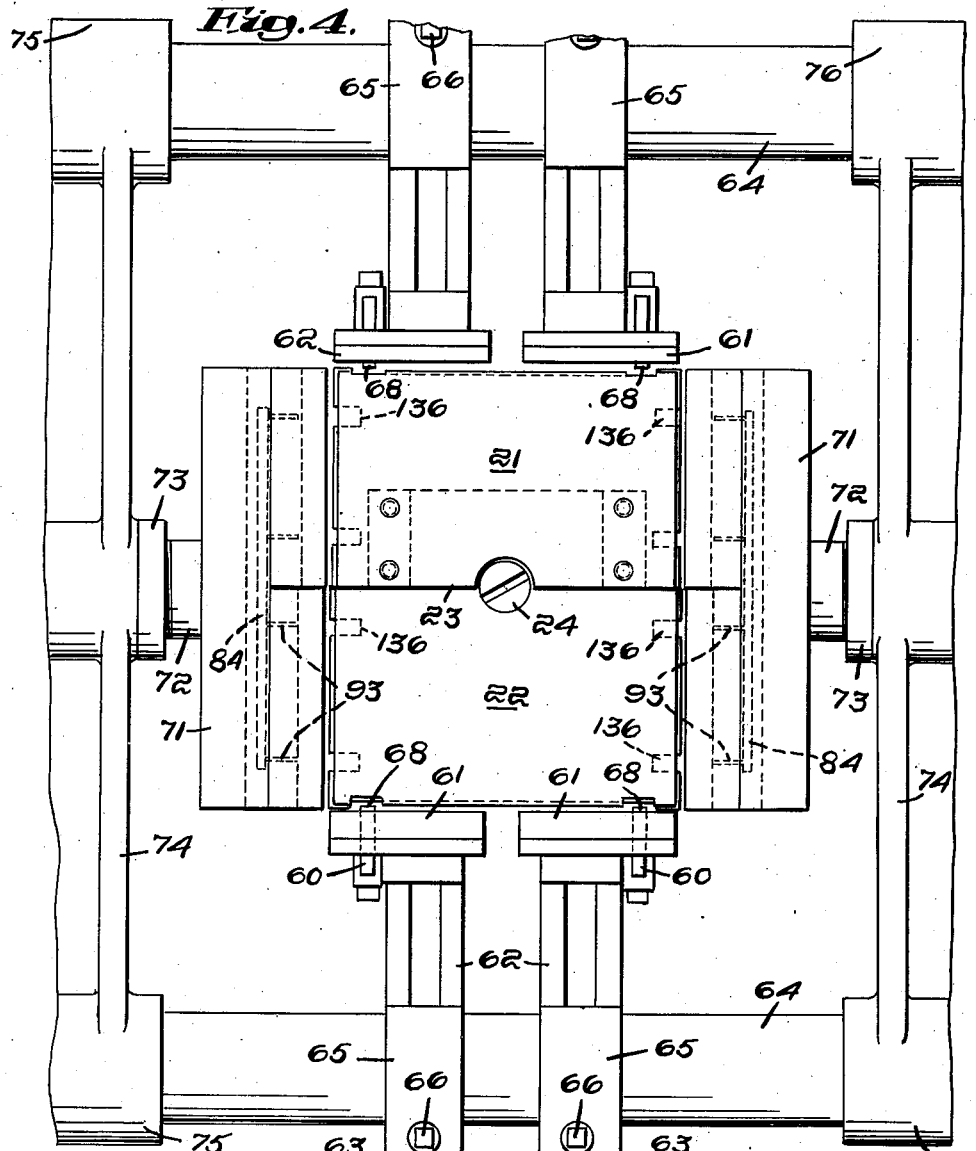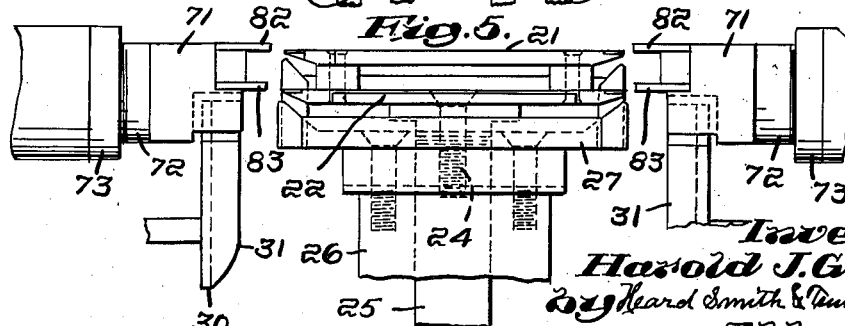

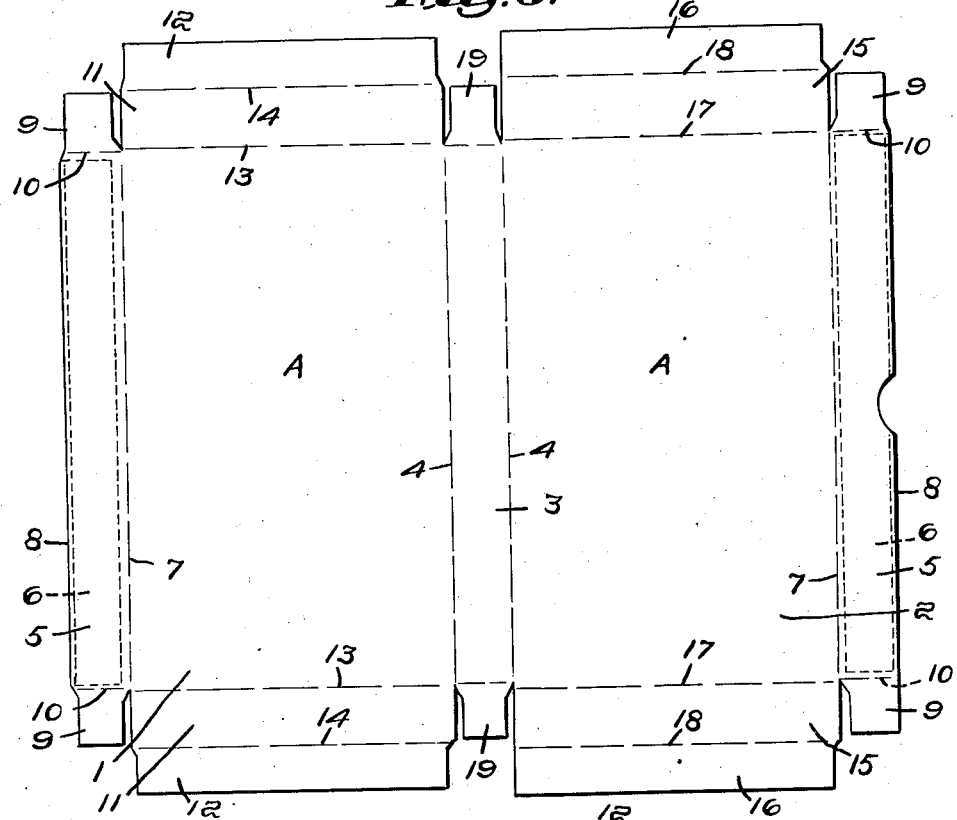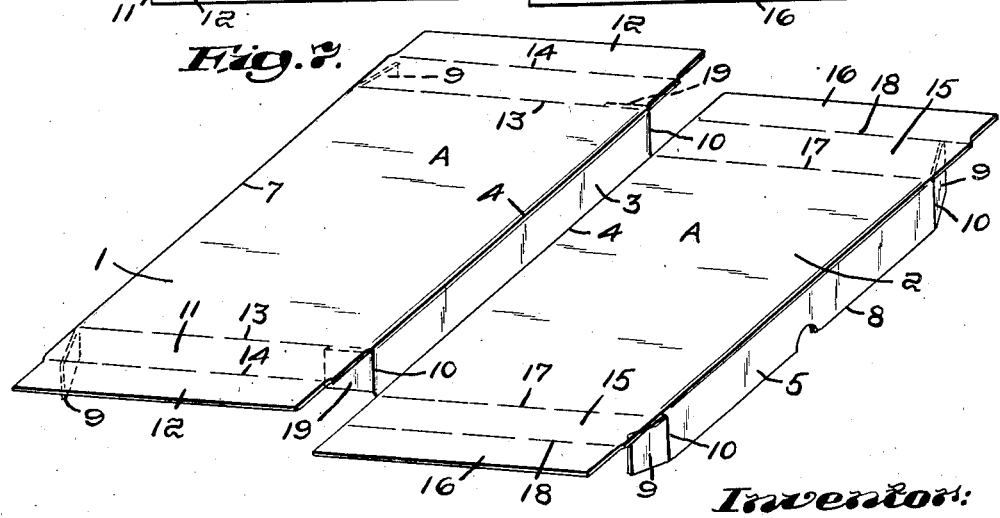

Inventor:
Harold J. Goss,
by Heard Smith & Furman
Attorneys

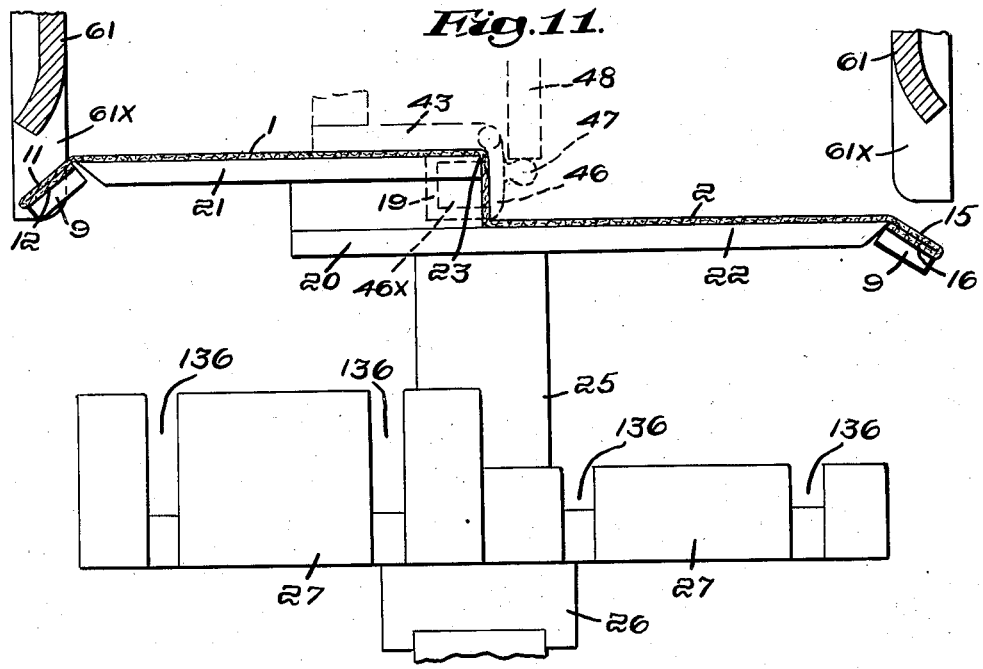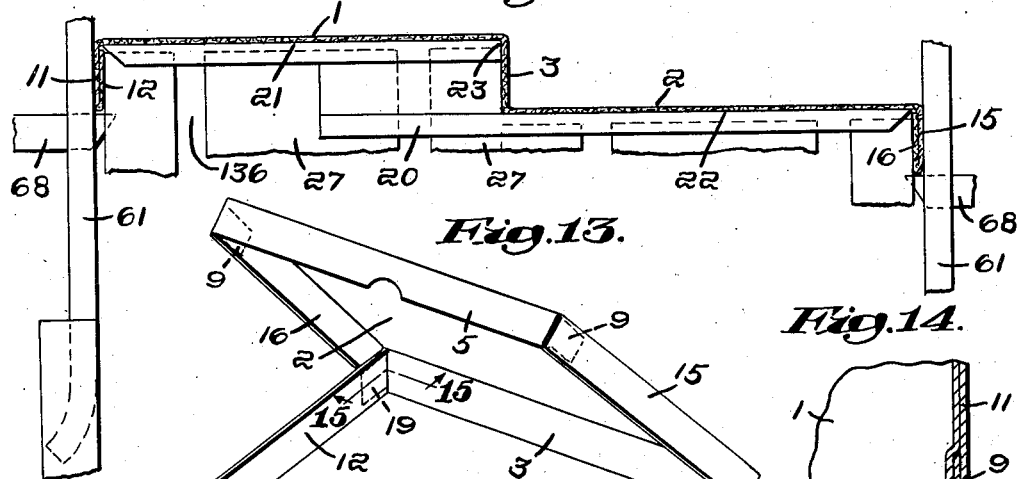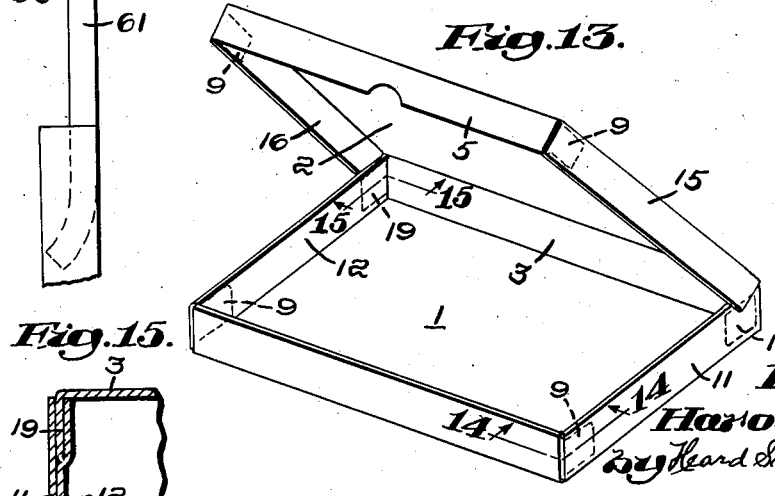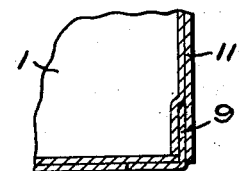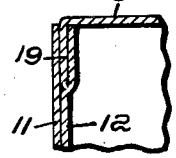

Patented May 10, 1949

2,469,641

UNITED STATES PATENT OFFICE 2,469,641

METHOD OF AND MACHINE FOR MAKING UNITARY SETUP COVERED BOXES

Harold J. Goss, Nashua, N. H., assignor to Central National Bank of Cleveland, Cleveland, Ohio Application January 4, 1947, Serial No. 720,159

16 Claims. (Cl. 93—51)

This invention relates to improvements in the manufacture of completely set-up unitary boxes having a hinged cover and the object of the invention is to provide a method and apparatus for forming a box of this type which will provide a box of greater rigidity and more pleasing appearance than has heretofore been produced.

More specifically an object of the invention is to provide a method and apparatus for forming a unitary box having a body provided with end walls of double thickness embracing and adhesively secured to and concealing tabs projecting from the ends of the rear wall of the body thereby providing a box of greater rigidity.

A further object of the invention is to provide a unitary box in which the end walls of the body and of the cover, and also preferably the front walls of the body and cover, are of double thickness and of greater rigidity than boxes of this type, and are smooth and continuous throughout their lengths.

Another object of the invention is to provide a more efficient and rapidly operating machine for automatically forming and setting up such boxes from a single blank.

Another object of the invention is to provide novel mechanism for removing the finished box from the setting-up mechanism, closing the box and releasing the closed box.

More specifically the invention comprises improvements on the box forming mechanism disclosed in my prior Patent No. 1,959,235, granted May 15, 1934.

The box disclosed in that patent, as illustrated in Figs. 6–11 thereof, comprises a chambered body or receptacle with a vertical rear wall, to which the cover is integrally connected by a fold, a front wall of double thickness, and end walls of double thickness formed of inner and outer adhesively connected panels, the outer end panels terminating substantially short of the rear wall, and a tab extending from the rear wall overlapping the inner panel and fitting the space between the end of the shorter panel and the rear wall lying flush with the outer panel.

In an improved box of the present construction the inner and outer walls of the end panels are of equal length and the tabs extending from the rear wall of the body are folded and adhesively secured between the inner and outer end panels, thereby providing a construction of greater rigidity, of more pleasing appearance, and in which the enclosed tab cannot be engaged and displaced in handling or otherwise or released if the box is subjected to external moisture conditions likely to affect the adhesive.

The mechanism for forming and delivering the box as shown and described in Patent No. 1,959,235 aforesaid comprises cooperating telescopically movable vertical plungers the inner one having at its upper end a former, upon which a blank is placed, provided with stepped upper and lower flat surfaces in parallel planes with a substantially central vertical wall therebetween equal to the depth of the box to be formed, and a complementary vertically movable upper plunger provided with means for folding a central portion of the blank against the vertical wall to form the rear wall of the box.

Means are provided for feeding a blank upon the former in a direction transversely of the length of the box when in lowered position, and means for depressing the upper plunger while the lower plunger is in lowered position to offset the cover portion of the blank from the body thereof.

Suitable mechanisms are provided for then moving the plungers upwardly and folding the panels of the blank which form the front walls of the body and cover to vertical position. When the former has been raised to a predetermined set-up position it is arrested in registry with folding mechanisms which cooperate respectively with and press against all four sides of the former to assemble and erect the box. Means are thereupon provided for raising the box from the former and shoving it laterally and eventually closing the box and delivering it into a suitable receptacle having means for accumulating successive boxes thus deposited in it.

The mechanisms for forming, assembling, closing and delivering a box of the character above described are illustrated in the accompanying drawings in sufficient detail to show the improvements upon the constructions disclosed in my prior Patent No. 1,959,235 aforesaid and Reissue Patent No. 16,193, granted to me October 27, 1925, which contain plunger-actuating mechanisms of a similar character to that employed in the present machine and need not therefore be illustrated in detail in the drawings of this application.

In the construction disclosed in the aforesaid patents the blanks are successively fed individually from a stack in the direction of the width of the blank and special complicated mechanisms are provided for applying adhesive to the tabs projecting from the center and end panel of the blank before it is positioned in registry with the forming and setting-up mechanism. In the present construction the blanks are similarly fed individually from the stack in the direction of the width of the blank and the end panels of the blank folded and adhesively secured together. The blank then is fed to blank turning mechanism such as that disclosed in my prior application Ser. No. 673,349, filed May 31, 1946, in which the blank is turned at right angles and forwarded in the direction of its length to mechanism which applies adhesive to the doubleable side panels of the blank which form the doubled end panels of the box, with means such as described in my prior patents for bending the tabs which extend from said sides out of the path of the glue-applying mechanism. One of the objects of the present invention is to avoid the necessity for the complicated mechanism for spotting the tabs with adhesive required in the construction disclosed in my prior Patent No. 1,959,235 and to enable the blank to be forwarded in the direction of its length to the former which carries it to the setting-up mechanism.

Another object of the invention is to provide mechanism for more effectively offsetting the cover portion of the blank from the body portion thereof to form the rear wall of the box.

Another object of the invention is to provide a construction by means of which the tabs extending from the offset rear wall of the box are folded between the outer and inner end panels of the body of the box and adhesively secured therebetween to form a more rigid box body.

Another object of the invention is to provide improved means for removing the set-up box from the forming mechanism and closing and delivering the completed box.

Another object of the invention is to provide an improved machine for making boxes of the type described capable of more rapid, accurate and efficient operation than machines heretofore constructed.

These and other objects and features of the invention will more fully appear from the following description and the accompanying drawings and will be particularly pointed out in the claims.

In the drawings:

Fig. 4 is an enlarged plan view of the lower blank forming member and the mechanisms for folding the side and end panels of the body and cover of the box;

Fig. 5 is an enlarged diagrammatic detail front elevation of the former and plunger members in raised position and illustrating positions of the panel folding mechanisms relatively thereto but removed from operative relation;

Fig. 6 is a plan view of the blank from which the box forming the present invention is produced;

Fig. 7 is a perspective view of the blank having the body and cover sections offset in different planes and connected by the rear wall of the box with the side panels bent downwardly and the tabs of the blank bent inwardly preparatory to infolding between the side panels of the blank to form the double end walls of the body and cover of the box;

Figure 9:
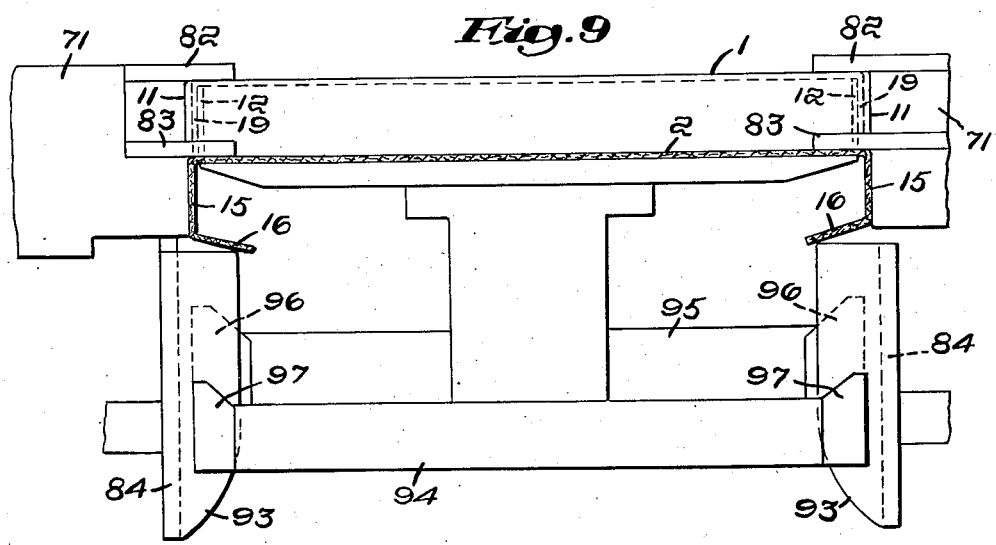
Figure 10:
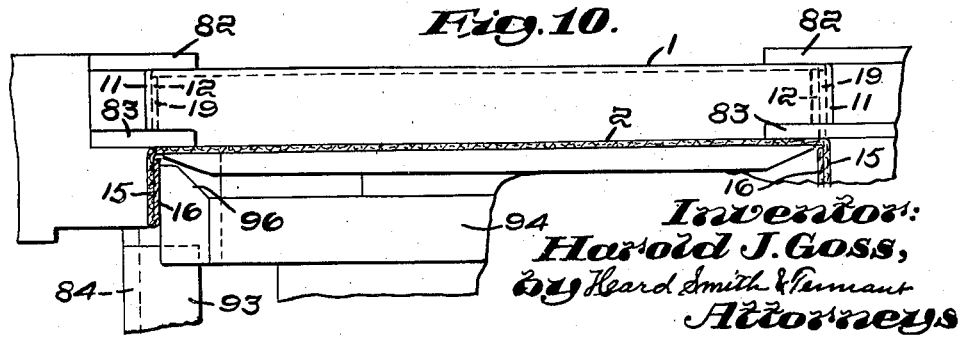

Fig. 9 is a similar enlarged diagrammatic view showing the lower forming member raised to set-up position with the side folding members engaging and folding the intermediate side panels of the box to vertical position with the outer panels bent inwardly, the cooperating lower plunger being in partially depressed position, and tucker members engaging the inwardly bent outer flanges preparatory to doubling the side panels of the blank;

Fig. 10 is a similar enlarged diagrammatic view showing the position of the parts when the side panels of the blank have been doubled and the setting-up of the box completed;

Fig. 11 is an enlarged diagrammatic sectional view longitudinally of the blank showing the cooperating vertically movable forming members for producing the offset of the body and cover blank preparatory to folding the doubled end walls of the blank which is the first step in the blank-forming operation, the cooperating plunger being in depressed position;

Fig. 12 is a similar diagrammatic view illustrating the lower forming members when raised to setting-up position;

Fig. 13 is a perspective view of the finished box with the cover in partially raised position, illustrating the rigid construction of the finished box;

Fig. 14 is an enlarged detail sectional view on line 14—14 Fig. 13; and,

Fig. 15 is an enlarged detail sectional view on line 15—15 Fig. 13.

As shown herein, the invention is embodied in a machine somewhat similar to that disclosed in Patent No. 1,959,235 in which the blank is moved upwardly from blank-receiving to setting-up position, but the machine may be constructed that these positions are reversed and the blank moved downwardly.

The blank A, from which the integral folding box is formed, is illustrated in Fig. 6 and comprises a flat sheet of suitable stiff paperboard, cardboard, or other readily formable material having in the direction of its length a rectangular area 1 to from the bottom of the body of the box, a similar slightly wider and longer area 2 to form the cover portion of the box adapted to overlie the bottom in the completed box, and a rectangular intermediate area 3 to form the vertical rear wall of the box defined by suitably spaced score lines 4 extending transversely of the length of the blank.

The ends of the blank are provided respectively with rectangular intermediate and terminal extensions forming panels 5 and 6 defined by score lines 7 and 8, the terminal panels which are illustrated in dotted lines being folded inwardly and adhesively secured to the inner faces of the intermediate panels 5 in the blanks as fed to the forming and setting-up mechanisms of the machine. The ends of the blank thus folded form doubled front walls of the body and cover of the box upon its erection.

Each of the panels 5 has end extensions 9 defined by score lines 10 and adapted to be infolded thereupon between intermediate and terminal panels of extensions of the sides of the bottom and cover areas of the blank which, when the box is erected, form the doubled end walls respectively of the body and cover. The rectangular bottom area 1 of the blank has intermediate side panels 11 and terminal panels 12 defined respectively by score lines 13 and 14 and the cover area 2 likewise has intermediate panels 15 and terminal panels 16 defined by score lines 17 and 18. The narrow rectangular intermediate area 3, which forms the rear wall of the box, is provided with end tabs 19 which terminate sufficiently short of the score lines 14 to permit the tabs 19 to be folded and adhesively secured between the panels 12 and 11 of the ends of the body.

Inasmuch as the side panels of the body and cover areas of the preferred blank lie in the same plane the under surfaces thereof can be conveniently coated with adhesive during the longitudinal movement of the blank as it is being delivered to the forming and setting-up mechanism, means being provided for bending the tabs 9 and 19 away from the adhesive applying mechanism thereby avoiding the necessity of providing special mechanism for spotting adhesive on the tabs 19 required in the previous construction for producing the box disclosed in Patent No. 1,959,235.

In the present invention uncoated tabs 9 and 19 are infolded and adhesively secured respectively between the adhesive-coated surfaces of the panels 11 and 12 of the body and between the adhesive-coated surfaces of the panels 15 and 16 of the cover, thereby providing a box of greater rigidity than has heretofore been produced.

The machine for forming and setting up the box blank shown in Fig. 6 of the drawings, like that disclosed in my prior Patent No. 1,959,235, comprises a stepped lower former 20 having, as shown in Figs. 1 and 8-12, a flat upper surface 21 to receive the bottom area 1 of the blank, and a downwardly offset flat surface 22 parallel therewith underlying the cover section 2 of the blank and providing a ledge 23 over which the central rectangular area 3 of the blanks may be bent to form the rear wall of the box body.

The former 20, as shown in detail in Figs. 4 and 5, is secured by a screw 24, or other suitable means, to the upper end of a plunger 25 which is reciprocably mounted in a vertically movable cooperating plunger 26 having at its upper end a head 27 provided with means to cooperate with the former 20 when the latter is in setting-up position. Suitable mechanism such as that disclosed in my prior patents may be and are employed to actuate the respective plungers in properly timed relation and therefore are not illustrated.

In the present machine, as in that disclosed in my prior Patent No. 1,959,235, an upper supplemental plunger cooperates with the former of the lower plunger to offset the cover area 2 of the blank from the body area 1. The supplemental plunger, which cooperates with the former 20, comprises a head 28 of rectangular cross section upon the lower end of a preferably rectangular bar 29 of relatively small cross section which is reciprocably mounted in an open guideway in a normally vertical frame 30. The frame 30 has a lateral boss 31 which is fixedly secured to a rock shaft 32 which is journaled at its respective ends in usual vertical side frames of the machine (not shown). The rock shaft 32 has an arm 33 provided with a follower roll 34 which engages a cam 35 on a continuously rotating shaft 36. The follower is held in engagement with the cam by a spring 37 which is connected at one end to it and at the opposite end to a tie bar 38 connecting the side frames of the machine. The cam 35 has a cylindrical lobe which normally holds the frame 30 and the plunger 28 which is reciprocably mounted therein in vertical position, but has a face of less diameter to permit the frame and plunger to be swung about the axis of the rock shaft 32 to remove the upper plunger out of the path of the mechanism for removing the finished box from the former and discharge it as will hereinafter be more fully described.

Figure 2:
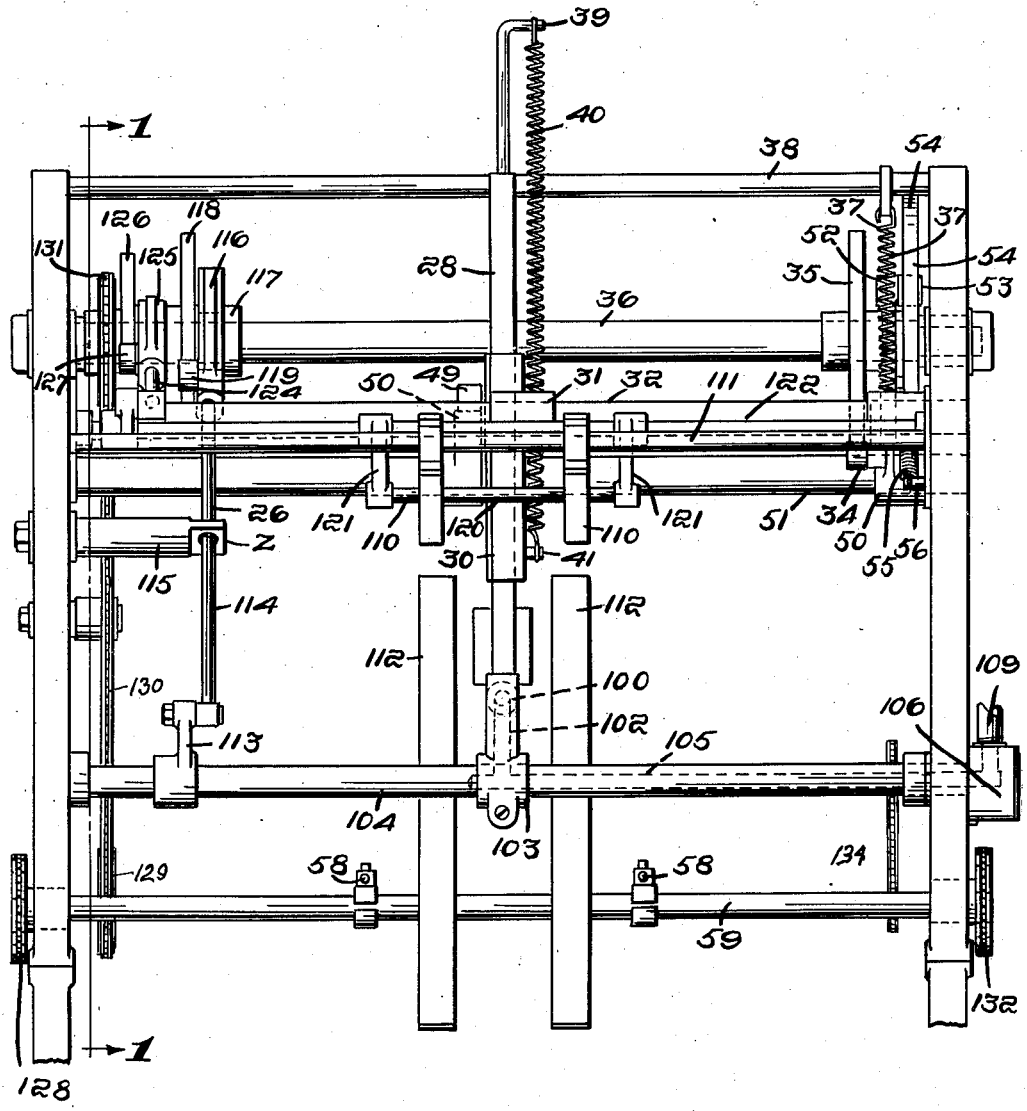
Fig. 2 is a front elevation of the upper mechanism shown in Fig. 1, omitting the lower forming mechanism in the interest of clearness.
Figure 3:
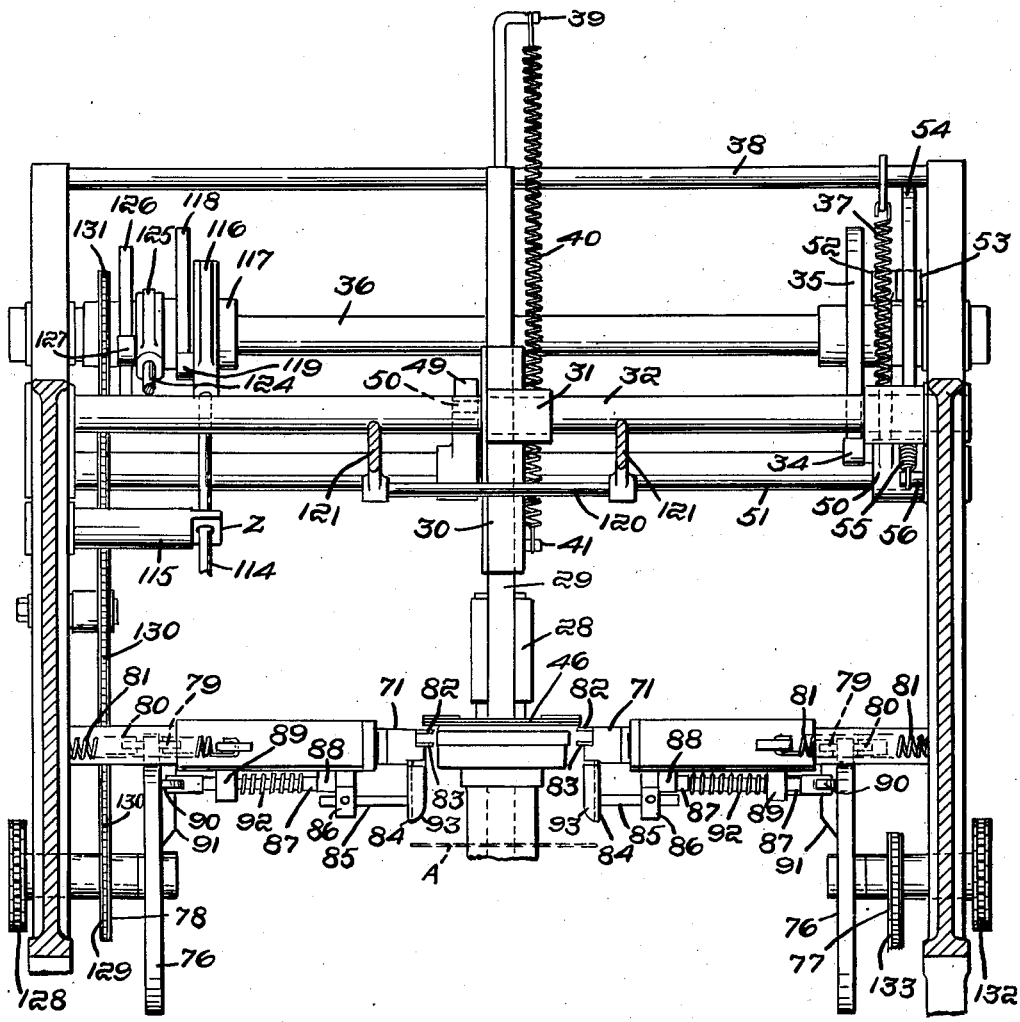
Fig. 3 is a front view of the construction shown in Fig. 1 showing the positions of mechanisms preparatory to folding and assembling the side panels of the blank which when assembled form the ends of the body and cover.

The upper end of the bar 29 desirably has a relatively small cylindrical extension with a laterally bent end portion 39 to which is connected the upper end of a tension spring 40 the lower end of which is connected to a stud 41 on the frame 30, as shown in Figs. 2 and 3, and tends to force the plunger downwardly.

Figure 1:
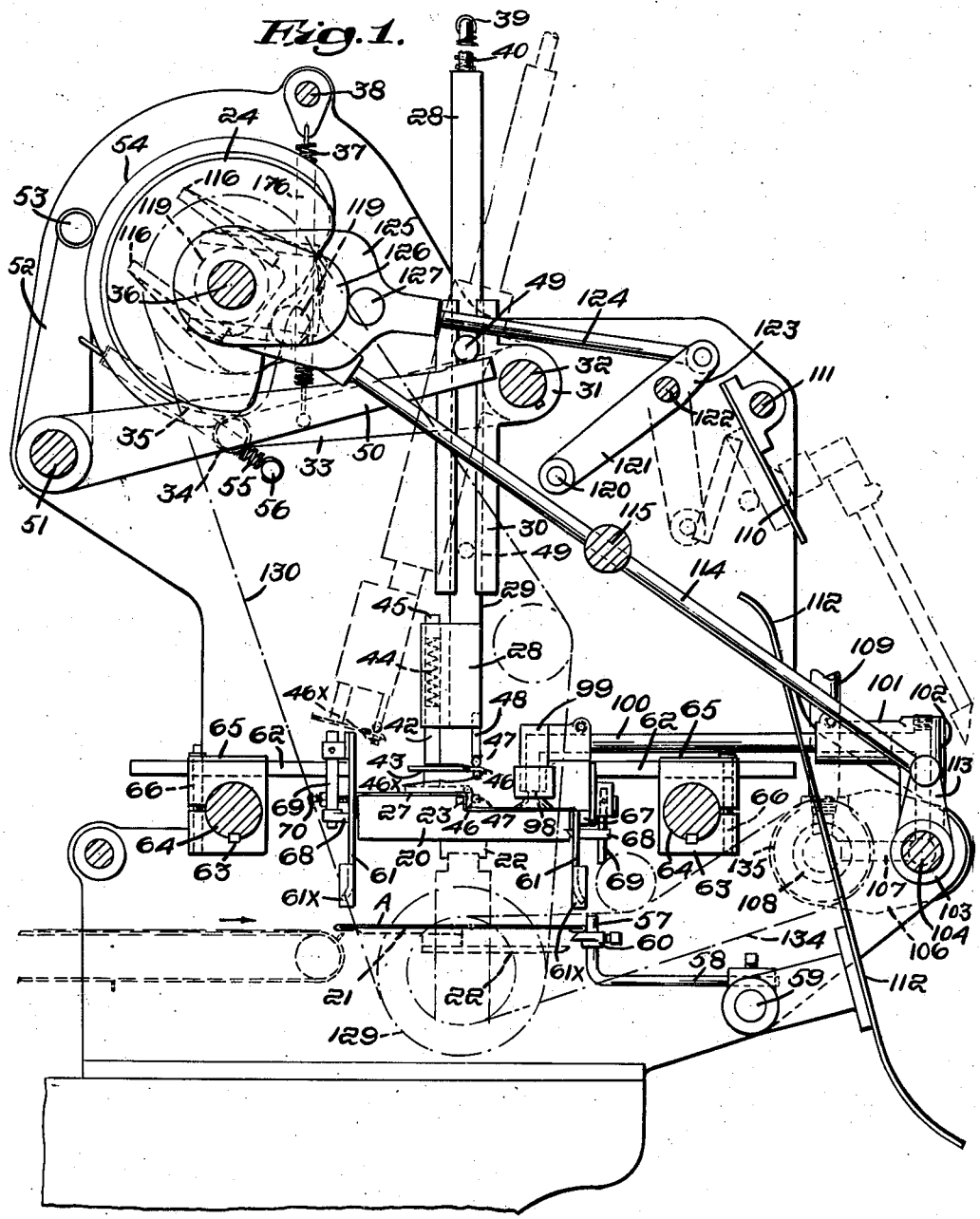
Fig. 1 is a vertical transverse sectional view of essential features of the present invention on line 1—1 Fig. 2, viewed in the direction indicated by the arrows.

The plunger head 28 has a vertical bore in which is mounted the stem 42 of a presser plate 43 and a compression spring 44 in said bore which is interposed between the upper end of the stem 42 and a screw or plug 45 in the upper end of the bore normally forcing the presser plate downwardly a predetermined distance below the plunger head 28, as shown in Fig. 1. The presser plate 43 is of sufficient width to overlie a substantial portion of the upper surface 21 of the former 20 and to extend a short distance over the ledge 23 of the former and serves to clamp the bottom section of the blank firmly upon the upper surface 21 of the former plate.

A wing 46, which is hinged upon the edge of the presser plate that overlies the ledge 23, extends throughout the length of said presser plate and ledge and normally is held in horizontal position by a spring which may be a part of the hinge. The wing 46 has about midway of its width a longitudinal rib or spaced bosses 47 preferably having a rounded upper edge which is normally engaged by the lower end of a presser bar or bars 48 extending downwardly from the head 28. By reason of this construction the wing 46 is enabled to be swung about its pivot more freely and efficiently when forced downwardly by the plunger head 28 than in the construction disclosed in my prior patent in which the wing is swung abruptly downwardly by an offset portion of the plunger head which engages the wing in proximity to its hinge.

The wing 46 is provided at its ends with short thin flat leaf springs 46x which extends perpendicularly downwardly from the wing when the latter is in raised position shown in Fig. 1. When the wing is swung downwardly by engagement of the rib or bosses 47 by the bar 48 on the descending upper plunger the leaf springs 46 engage the tabs 19 which project from the ends of the intermediate section of the blank and bends them to vertical position alongside the ends of the body portion of the blank in position to be embraced by the adhesive coated surface of the panels 11 and 12 of the blank when the latter are folded to form the doubled end wall of the body. By reason of this construction the tabs 19 are secured within the inner and outer end panels of the body of the box and concealed thereby thus providing a more rigid and pleasing box construction. By reason of this construction blanks having uncoated tabs extending from the intermediate portion 3 of the blank in the original plane thereof may be forwarded longitudinally to the forming mechanism thus avoiding the necessity of spotting such tabs with adhesive which was required in the construction disclosed in my prior patent in which the blanks were fed to the forming mechanism in the direction of their width. It also avoids the necessity of having special reciprocating folding mechanism operating upon all four sides of the former heretofore required to set up the box.

In the present construction the upper blank-clamping plunger 28 is normally held in upraised position against the tension of the spring 40 by suitable lever and cam mechanisms. As shown in Fig. 1 the bar 29 has secured to it a stud projecting through a guideway in the frame 30 and having on the end thereof an antifriction roller 49 and which is normally engaged by and held in upraised position by the end portion of an arm 50 of a bell crank lever which is fulcrumed on a tie bar 51 mounted in and extending across the side frames of the machine. The other arm 52 of the bell crank lever extends upwardly therefrom and is provided at its end with a cam follower roll 53 which engages a cam 54 on the continuously rotating shaft 36. The cam follower 53 is held in engagement with the cam 54 by a tension spring 55 which is connected at one end to the arm 52 of the bell crank lever and at its other end to a stud 56 extending from one of the side frames.

The cam 54 is provided with a cylindrical lobe which normally causes the arm 50 of the bell crank lever 51—52 to hold the upper plunger in upraised position as shown in Fig. 1. The cam 54 has a reentrant face of less diameter adapted to permit the upper plunger to descend in timed and cooperative relation to the movement of the lower plunger.

The mechanism for co-ordinating the movements of the upper plunger with that of the lower plunger 25 and its forming plate 20 may be and is similar to that disclosed in my prior Patent No. 1,959,235 and need not be further illustrated or described. It is sufficient to say that in the operation of the present machine, as in that disclosed in Patent No. 1,959,235, the stepped former 20 is first lowered to the blank receiving position illustrated in Fig. 1 and in dash lines in Fig. 3.

The blank A is forwarded in the direction of its length by the feeding mechanism in such manner as to place the bottom area 1 upon the upper flat surface 21 of the blank with the cover area 2 and the intermediate area 3 overlying the lower flat surface 22 of the former. The upper plunger is then permitted by the action of the cam 54 to descend by gravity supplemented by the force of the spring 40, as illustrated herein (or by weights as shown in the patent), thereby causing the wing 46 upon the upper plunger head to swing and fold the intermediate portion 3 of the blank against the ledge 23 of the former and offset the cover portion of the blank below the plane of the body portion thereof, as shown in Fig. 7. At the same time the downward swinging movement of the wing 46 causes the flat leaf springs to engage and fold the tabs 19 at right angles to the intermediate portion along the fold lines 13 of the panels 11 in position to be embraced between the adhesive coated faces of the panels 11 and 12 when the latter are folded to form the double end walls of the box by means hereinafter described.

The lower plunger is then raised carrying the upper plunger with it to set-up position during which movement the doubled end panels of the blank and the side walls of the panels are bent to vertical position as hereinafter described.

In the operation of the machine illustrated in the drawings the blank A is fed by usual mechanisms, such as chains having upwardly projecting pins to engage the rear end of the blank and forward it in the direction of the length of the blank until the blank rests upon the upper face 21 of the former 20 and the doubled front end panel of the cover portion is arrested by suitably spaced stops which, as shown in Fig. 1, are the vertical end portions 57 of suitably spaced horizontal bars 58 which are adjustably clamped upon a tie bar 59 of the machine.

The vertical ends 57 of the stop bars desirably are provided with adjustable supports 60 for holding the doubled front panel of the blank until the blank is engaged by the descending upper plunger head 28 and its central area 3 bent against the vertical ledge 23 to offset the cover area 2 from the bottom area 1 and press the cover area 2 against the lower surface 22 of the former 20, as shown in Fig. 11, and to cause the springs $46x$ at the ends of the wings 46 to bend the tabs 19 around the ends of the ledge 23 and hold them in that position, the thin spring extensions $46x$ being so short as not to gather glue when the side panels 12 are folded to doubled position.

Upon upward movement of the cooperating lower and upper plungers the doubled end panels of the blanks engage pairs of suitably spaced flat folder plates 61 having vertical end sections $61x$ perpendicular thereto which are fixedly secured to and extend downwardly from horizontal bars 62 which are adjustably clamped in ways in the upper surface of split blocks 63 which are keyed to cross rods 64 mounted in the side frames. The bars 62 are adjustably clamped in the ways by plates 65 overlying the upper surfaces of the blocks 62 by screws 66 which extend through the split sections of the blocks 63. One of the pairs of folder plates 61 (the one on the right) is offset inwardly by spacing blocks 67 to avoid interference with the box discharging mechanism hereinafter described.

The engagement of the doubled end panels of the blank with the folder plates 61 as the plungers and former 20 move upwardly bends the doubled end panels downwardly to vertical position and progressively deflects the end tabs 9 inwardly, as shown in Figs. 11 and 7.

When the former plate 20 has been raised to setting-up position, in which the box is assembled, yieldable fingers having upwardly beveled shouldered ends engage beneath the lower edges of the doubled end panels to insure the stripping of the blank from the former 20 when the lower plunger descends after the setting-up operation.

The preferred stripping mechanism comprises fingers 68 which extend through apertures in the folder plates 61 and are secured to flexible or spring actuated vertical rods 69 which are pivotally supported at their upper ends by brackets secured to the folder plates 61 and adjustably positioned by stop screws 70 (one of which is shown in Fig. 1) which is mounted in the rods 69 and abuts against the folder plate 61. By properly adjusting the stop screw the end of the fingers 68 can be accurately set yieldably to engage the end of the former plate 20 without extending into the path thereof as it is moved vertically.

When the former plate 20 is raised and the doubled end panels bent down by the folder plates 61 the rising panels will engage the beveled ends of the stripping fingers and force them outwardly until the lower edge of the doubled end panels pass beyond the fingers whereupon the latter will be forced inwardly by their springs beneath the edges of the panels to stripping position so that when the lower plunger and its former 20 descends release of the set-up box from the former 20 will be insured.

*The side folding mechanism*

The mechanism for folding the side panels of the blank and infolding the tabs 9 and 19 thereof to set up and assemble the box comprises means for bending the intermediate side panels 11 and 15 (Figs 6 and 7) downwardly against the sides of the former, then bending the outer side panels 12 and 16 inwardly, as shown in Fig. 9, and finally folding them against the inner faces of the intermediate panels as shown in Fig. 10, with the respective uncoated tabs 9 and 19 therebetween, so that they will be fixedly secured between the intermediate and end panels to form the rigid box construction heretofore described.

The preferred mechanism for accomplishing this purpose as illustrated herein comprises presser bars 71 of rectangular cross section which extend throughout the length of the sides of the former 20, as shown in Fig. 4, and have centrally of their length cylindrical bosses 72 which are fixedly secured to bosses 73 in sliding frames 74 the ends of which are provided with cylindrical bosses 75 which are slidably mounted upon the cross rods 64. The sliding frames and the means for actuating the same to fold the side panels of the blank is similar to that disclosed in my prior patent No. 1,651,200, granted November 29, 1927, but differs therefrom in that in the present invention the sliding frames actuate presser members for folding and assembling the side panels of the bottom and cover sections of the box instead of the end panels of a box body as shown in that patent.

The mechanism for reciprocating the sliding frames 74, like that disclosed in Patent No. 1,651,200, comprises cams 76 fixedly secured upon shafts which are driven by sprockets 77 and 78 respectively and are engaged by pairs of follower rolls 79 and 80 respectively mounted on the bosses of the sliding frames. The cam rolls 79 are held in engagement with the face of the cam by tension springs 81 having their ends connected respectively to the bosses 75 and to the side frames in the manner shown in said patent No. 1,651,200.

The presser members 71 are provided with upper and lower inwardly projecting ledges 82 and 83 adapted respectively to overlie the upper surfaces 1 and 2 of the blank, when the former 20 is raised to set-up position and to hold said surfaces firmly upon the upper surfaces 21 and 22, thereby preventing buckling of the blank when the upper plunger is raised.

Figure 8:
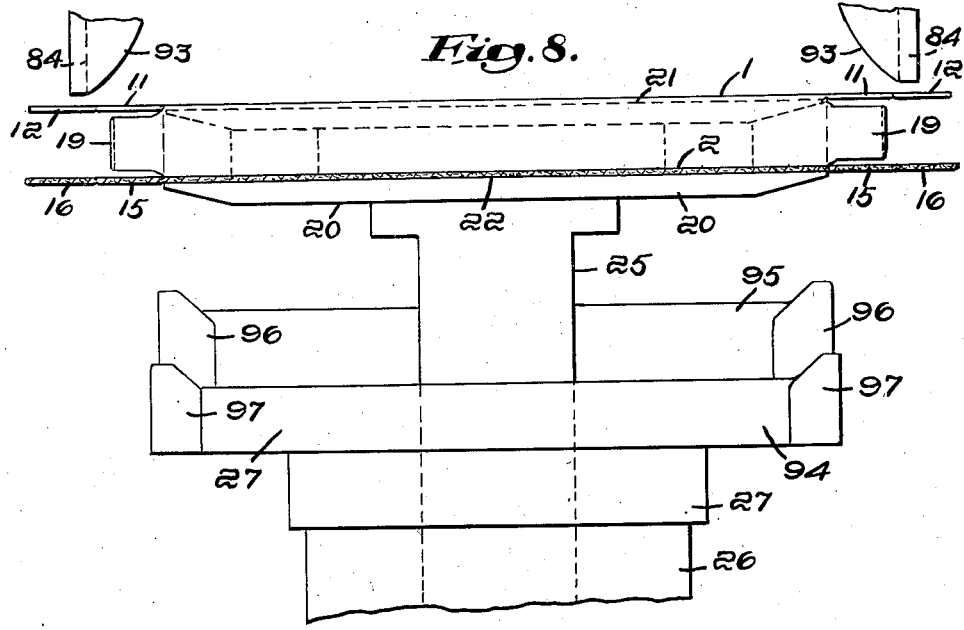
Fig. 8 is an enlarged diagrammatic view showing in vertical cross section the blank engaged by the lower surface of the forming member when offset as shown in Fig. 7 before being raised to setting-up position and showing the position of the members for folding the sides of the blank which form the ends of the box.

Means are provided for bending the side panels 11—12, 15—16, downwardly, then folding the outer panels inwardly, and finally pressing them against the intermediate panels 11 and 15 in steps diagrammatically shown in Figs. 8, 9, and 10.

The mechanism for bending inwardly the end panels comprises vertical tucker plates 84 which extend lengthwise of and beneath the presser members 71 and are fixedly secured upon the ends of horizontal rods or bars 85 which extend through and are adjustably mounted in heads 86 extending downwardly from rods 87 which are slidably journaled in bearings 88 and 89 extending downwardly from the hubs 73 of the frames 74.

The outer ends of the rods 87 are provided with cam follower rolls 90 which engage cams 91 on the inner faces of the cam disks 76 and adapted during the rotation of the cam disks to force the respective tucker members inwardly. Springs 92, which surround the rods 87, normally hold the cam follower rolls in engagement with the face of the cam disk 76.

The inner faces of the tucker plates 84 are provided with inwardly extending fins 93 for folding the outer edge panels 12 and 16 respectively of the sides of the blanks inwardly.

The operation of the mechanism for folding the side panels of the blank is diagrammatically shown in Figs. 8, 9, and 10, in which Fig. 8 shows the former 20 in lowered position below the vertical tucker plate 84 preparatory to the upward movement of the former 20. Upon the upward movement of the former 20 the intermediate and side flanges 11—12, and 15—16, of the body and cover respectively engage the vertical tucker members 84 and the fins 93 thereof thereby bending the panels 11 and 15 downwardly upon the fold lines 13 and 17 respectively to vertical position, as shown in Fig. 9. The presser bars 71 are then forced inwardly by the cam 76 until the ledges 82 and 83 overlie the offset upper surfaces 1 and 2 of the blank. The tucker plates 84 are then forced inwardly, as shown in Fig. 9, to bend the outer panels 12 and 16 inwardly as shown in Fig. 9.

The folding of the end panels 12 and 16 against the intermediate panels 11 and 15 is then accomplished by the upward movement of the cooperating plunger 26 (Fig. 5) the head 27 of which is provided with stepped plates 94 and 95 having at their respective ends upwardly inclined extensions 96 and 97 which fold the end flanges 12 and 16 against the faces of the intermediate panels 11 and 15, as shown in Fig. 10 with the previously bent tabs 9 which extend from the ends of the intermediate panels 11 of the box body and the previously bent tabs 19 which extend from the ends of the rear wall 3 of the box body inserted respectively between the panels 12 and 11 of the box body. Similarly the previously bent tabs 9 which extend from the ends of the panels 5 and 6 of the cover section are folded between the adhesive coated panels 16 and 15 thereby completing the set-up or assemblage of the box.

A further important improvement in the present invention over that disclosed in my prior Patent No. 1,959,235 comprises mechanism for removing the assembled box from the former 20, closing the box and delivering it. This is accomplished in the present invention by pneumatically operable suction mechanism having a suction head which after the completion of the assembling operations engages the exposed face of the cover of the box, then moves upwardly to remove the box from the former, thence laterally preferably in an arcuate path, during which movement the box is closed by suitable mechanism, and thereupon released and permitted to drop upon a suitable chute.

The preferred form of pneumatic box discharging mechanism which is illustrated in the drawings comprises a conical suction head 98 of rubber secured to the lower end of a tubular L- shaped fitting 99 which is clamped or otherwise secured upon the end of a pipe 100 the other end of which pipe is adjustably secured to the arm 101 of a tubular L-shaped fitting, the other arm 102 of which is provided with a hub 103 which surrounds and is fixedly clamped upon a rock shaft 104 mounted at its ends in the side frames of the machine.

The rock shaft 104 has a tubular bore 105 which communicates at one end with a conduit in the arm 102 of the L-shaped fitting and at its other end with a conduit in a casing 106 which is fixedly mounted upon one of the side frames and has a conduit 107 which communicates with a rotary valve 108 mounted in the casing 106. The pipe 109 leads from the valve 108 to suitable means for exhausting air through said valve and said conduits to apply suction to the suction head.

Suitable means are provided for oscillating the rock shaft 104 in timed relation to the completion of the operation of the setting-up mechanism to swing the tubular arm 100 downwardly into engagement with the blank and then to swing the arm upwardly to the position illustrated in dotted lines in Fig. 2 thereby to cause the box to engage stop plates 110 which are mounted upon a cross bar 111 thereby to remove the finished box from the former to discharge position.

Other means are suitably actuated in properly timed relation to the vertical swinging movement to close the box when it has been arrested by the stop plate 110 and means are thereupon operated to release the suction upon the box to permit it to drop upon inclined plates 112 forming a chute for delivering the box to a suitable receptacle.

The mechanism for oscillating the shaft 104 as illustrated herein comprises an arm 113 which is fixedly secured to the rock shaft 104 and is pivotally connected to the lower end of a bar 114 which is guided centrally in a stud 115 projecting from the side frame of the machine and is provided at its upper end with a fork 116 which embraces the hub 117 of a cam 118 which engages a follower roll 119 on the fork 116. The mechanism for closing the box when it is swung upwardly to the dotted line position illustrated in Fig. 1 comprises a bar 120 of greater length than the width of the box which is mounted in bosses in the ends of arms 121 of a rock shaft 122 having adjacent its end an arm 123 which is connected by a rod 124 to a fork 125 which embraces the hub of a cam 126 which engages a follower roll 127 upon the fork 125. The cam 118 which swings the pneumatically operated box discharging mechanism upwardly to cause the box to engage the stops 110 and the cam 126 which actuates the box-closing bar 120 are so timed that as the box approaches the stop 110 the box-closing arm will engage the under face of the bottom of the box and when the box is arrested by the stop mechanism will close the box so that upon release of the suction, which likewise is properly timed in relation to the movements of the pneumatic box discharging and closing mechanisms, the box will be released and permitted to drop by gravity upon the plates 112 forming the chute and delivered to a suitable receptacle.

Suitable mechanisms are provided for rotating the cam shaft 36 and the valve which controls the application of suction in proper coordination. As illustrated herein power is applied through a sprocket wheel 128 to a shaft upon which one of the cams 76 is mounted and a sprocket gear 129 on said shaft drives a sprocket chain 130 through which a sprocket 131 is fixedly secured to the cam shaft 36. Similarly, power is applied through a sprocket 132 to the shaft which drives the other cam 76 and a sprocket 133 on said shaft drives a suitable sprocket chain 134 which drives a sprocket 135 which is secured to the rotatable valve 108.

In the operation of the machine the blank A having the infolded end panels is fed in the direction of its length, as shown by the arrow in Fig. 1, over and in engagement with the upper flat surface 21 of the former 20 until arrested by the stop 57, as shown in Fig. 1, the former at that time being in lowered position. The upper plunger 26 is then caused to descend until the yieldable pressure plate 43 engages the bottom portion of the blank and clamps it firmly upon the upper surface 21 of the former. Further downward movement of the upper plunger causes the member 48 to engage the upwardly extending rib or bosses upon the wing 46 and fold the intermediate panel 3 of the box blank over the ledge 23 to vertical position and at the same time to cause the thin springs 46 to bend the tabs 19 which extend from the intermediate portion 3 of the blanks alongside the former.

The lower plunger 25 which carries the former 20 is then raised from blank-receiving to setting-up position, the pressure plate of the upper plunger being raised at the same time with the clamping plate and wing remaining in clamping position.

During such upward movement of the former the doubled end panels 15 and 16 engage the folder plates 61 and successively bend them downwardly to vertical position as illustrated in Figs. 11 and 12. When the former has reached set-up position the stripping fingers 68 are forced by their springs beneath the lower edges of the end panels of the box.

During the upward movement of the former 20 the side panels of the blank engage the fins 93 of the tucker plates 84 which are yieldably mounted upon the pressers 71 which, when the former 20 reaches set-up position, are forced inwardly, thereby bending the intermediate end flanges 11 and 15 of the blank against the sides of the former. Further movement of the tuckers caused by the inward movement of the presser plates 71 then bends the side flanges 12 and 16 of the blank inwardly, as illustrated in Fig. 9. The cooperating plunger 26 is thereupon forced upwardly bending the end flanges 12 and 16 against the inner faces of the intermediate panels 11 and 15, as shown in Fig. 7, the head 27 of the cooperating plunger having vertical slots 136 into which the fins 93 of the tucker plates 84 extend when the tucker plates 84 are forced by their springs to the innermost position, as illustrated in Fig. 9.

The inward movement of the presser plates 71 above described fold the end tabs 9 which extend from the intermediate panels 11 and 15 inwardly so that they are positioned within the inner faces of the intermediate panels 11 and 15 respectively and upon infolding of the outer panels 12 and 16 are clamped between and adhesively secured to the ends of the intermediate and outer panels. At the same time the tabs 19 are similarly clamped between the intermediate panels 11 and outer panels 12 of the bottom portion of the blank. The force of the pressers 71 when applied firmly clamps the tabs between the then doubled walls of the side panels causing the doubled panels and the tabs therebetween to be firmly united to form a completed box.

When the box is thus completed the upper presser, which has been raised following the set-up operations thus described, is swung laterally (to the left) as illustrated in Fig. 1 to permit the assembled box to be removed from the former 20. The arm 100 of the suction mechanism is then swung downwardly until the suction head 98 is engaged with the upper surface of the cover section of the box, suction applied, and the arm 100 swung upwardly thereby removing the finished box from the former 20. As the box during its upward movement approaches the stop plates 110 the box closing bar 120 is swung into engagement with the under surface of the bottom section of the box and upon continued movement closes the bottom section of the box within the cover section when the box engages the stop plates 110. The suction is then released and the finished box permitted to drop by gravity upon the chute plates 112 which deliver the finished box to a suitable receptacle.

It will be understood that the particular embodiment of the invention which is shown and described herein is of an illustrative character and that various modifications in construction and arrangement of parts may be made within the spirit and scope of the following claims, and that the position and operation of the mechanisms to perform the functions above described may be reversed in such manner that the blank may be moved downwardly from an upper blank-receiving position to a lower setting-up position. It will also be understood that unitary boxes having a body and cover provided with single instead of doubled front walls and having doubled end walls may be made in the same manner and within the spirit and scope of the invention.

Having thus described the invention, what is claimed as new, and desired to be secured by Letters Patent, is:

1. Steps in the method of making a unitary covered box from a blank of suitable foldable material cut and severed to provide rectangular bottom and cover areas and doubled front and rear panels having uncoated tabs extending from the ends of the inner panels in the plane thereof, and a rectanguluar intermediate area therebetween to form the back wall of the box with uncoated tabs extending from the respective ends of the intermediate area in the plane thereof and doubleable outer and inner panels extending from the ends of the bottom area having on their inner faces an adhesive coating, which comprises folding the intermediate area to a position at right angles to the body and cover areas and folding the tabs extending from the ends of the intermediate area along the ends of the bottom area and thereafter folding the adhesively coated end panels around the tabs extending from the intermediate area and also around the tabs extending from the ends of the doubled front and rear panels, thereby fixedly securing the tabs therebetween and providing smooth front, rear and end walls of double thickness.

2. Steps in a mechanical method of making a unitary covered box from a blank of suitable foldable material cut and scored to provide rectangular bottom and cover areas and a rectangular intermediate area therebetween to form the back wall of the box with uncoated tabs extending from the respective ends of the intermediate area in the plane thereof and doubleable inner and outer panels extending from the respective ends of the bottom and cover areas having on their inner faces an adhesive coating which comprise clamping the blanks upon a stepped former having parallel flat surfaces corresponding respectively to the bottom and cover areas offset by a ledge corresponding in depth to the width of the intermediate area, simultaneously with said clamping action bending the end tabs projecting from the intermediate area rearward alongside the ends of the bottom area in position to enable the adhesively coated panels extending from the bottom area to embrace and secure the tabs extending from the intermediate area therebetween.

3. Steps in a mechanical method of making a unitary covered box having front and end walls of double thickness from a blank of suitable bendable material cut and scored to provide rectangular bottom and cover areas and an intermediate rectangular area therebetween to form the back wall of the box with uncoated tabs extending from the ends of said intermediate area in the plane thereof and having doubled adhesively united inner and outer panels extending from the front and rear of the body and cover areas to form the front walls of the body and cover of the box with uncoated tabs extending from the ends of the inner panels in the plane thereof and doubleable inner and outer panels extending from the ends of the bottom and cover areas of the box having their inner faces adhesively coated which comprise clamping the blank upon a stepped former having parallel flat surfaces corresponding respectively to the bottom and cover areas offset by a ledge corresponding in depth to the width of the intermediate area, simultaneously with said clamping action bending the tabs projecting from the ends of the intermediate section alongside and beneath the ends of the bottom areas and then folding the doubleable end panels of the body and cover about the respective uncoated tabs thereby adhesively uniting the tabs therebetween.

4. Steps in a mechanical method of making a rigid unitary covered box having front and end walls of double thickness from a blank of suitable bendable material cut and scored to provide rectangular bottom and cover areas and an intermediate rectangular area therebetween to form the back wall of the box with uncoated tabs extending from the ends of said intermediate area in the plane thereof and having doubled adhesively united inner and outer panels extending from the front and rear of the body and cover areas to form the front walls of the body and cover of the box with uncoated tabs extending from the ends of the inner panels in the plane thereof and doubleable inner and outer panels extending from the ends of the bottom and cover areas of the box having their inner faces adhesively coated which comprise feeding the blank in the direction of its length in registry with the upper surface of a vertically movable stepped former having parallel flat areas corresponding respectively to said bottom and cover areas offset by a central ledge corresponding in depth to the width of the intermediate area, clamping the blank upon the upper surface of the vertically movable stepped former, simultaneously bending the intermediate area at right angles to the bottom and cover areas and bending the tabs extending from the intermediate area rearwardly alongside the ends of the bottom area, moving the former from blank-receiving position to setting-up position, folding the doubled and doubleable panels vertically with respect to the bottom and cover areas during said movement, and finally folding the doubleable adhesively coated end panels of the body and cover about the respective uncoated tabs thereby securing the latter therebetween.

5. In a machine for making unitary covered boxes having vertically movable plunger mechanism provided with a former having stepped parallel surfaces for the bottom and cover area of the box movable from blank-receiving position to setting-up position, means for successively feeding into registry with the former in the direction of the length thereof flat blanks suitably scored to provide bottom and cover areas with a rectangular area therebetween to form the rear wall of the box, said blank having end panels provided with tabs extending from the ends thereof in the plane of said blank, and doubleable adhesively coated side panels extending from the bottom and cover areas respectively with uncoated tabs extending from said intermediate area in said plane, said machine having a vertically movable supplemental plunger provided with means cooperating with said former when the latter is in blank-receiving position to clamp and offset the blank upon said former in conformity thereto and simultaneously to bend the uncoated tabs of the intermediate area along the sides of the bottom area, means for moving the former to setting-up position, means operable during said movement to bend the end and side panels around the former and the tabs of the end panels inwardly toward the bottom area, and means operable when the former is in setting-up position to double the side panels with the tabs projecting from the end panels therebetween and the tabs projecting from the intermediate area between the adhesively coated faces of the foldable panels extending from the bottom area of the blank.

6. In a machine for making unitary covered boxes having a vertically movable plunger provided with a former having stepped parallel surfaces with a vertical central ledge therebetween and movable from blank-receiving position to setting-up position, a vertically movable supplemental blank-clamping plunger cooperating with the former when in blank-receiving position, having means for bending a central portion of the blank vertically about said ledge and having means for bending tabs projecting from the central portion of the blank along the side of the former, means for moving the former from blank-receiving position to setting-up position, means respectively cooperating with the former during such vertical movement and while in setting-up position to assemble the box, means for removing the completed box from the former, and means for removing the supplemental plunger laterally out of the path of the box in advance of and in properly timed relation to the operation of the box-removing mechanism.

7. In a machine for making unitary covered boxes having a vertically movable plunger provided with a former having stepped parallel surfaces with a vertical central ledge therebetween and movable from blank-receiving position to setting-up position, a vertically movable supplemental blank-clamping plunger cooperating with the former when in blank-receiving position having means for bending a central portion of the blank vertically about said ledge and having means for bending tabs projecting from the central portion of the blank along the side of the former, means for moving the former from blank-receiving position to setting-up position, means respectively cooperating with the former during such vertical movement and while in setting-up position to assemble the box, means operable upon completion of the box to move said former in the reverse direction, means for removing the completed box from the former, means for raising the supplemental plunger laterally out of the path of the box in advance of and in properly timed relation to the operation of the box removing mechanism and stripping means operable in coordination with the box removing mechanism upon said reverse movement of the former to insure removal of the box therefrom.

8. In a machine for making unitary covered boxes having a plunger vertically movable from blank-receiving position to setting-up position and having a former provided with stepped upper and lower flat surfaces with a vertical ledge of predetermined height therebetween to receive the bottom and cover areas of a blank provided with tabs extending from the central and end portions thereof, a vertically movable supplemental plunger cooperating with said former when in blank-receiving position and having a yieldable presser for clamping the body area of the blank upon the upper flat surface of the former, said presser having a wing of a width substantially equal to the height of said ledge pivotally connected thereto slightly beyond and overhanging said ledge and provided with means projecting upwardly therefrom intermediate of its width, and means rigid with said supplemental plunger adapted upon clamping movement thereof to engage the means extending upwardly from said wing operable upon downward movement of said presser to cause said wing to fold an intedmediate portion of the blank upon the ledge.

9. In a machine for making unitary covered boxes having a plunger vertically movable from blank-receiving position to setting-up position and having a former provided with stepped flat surfaces to receive the bottom and cover areas of a blank provided with tabs extending from the central and end portions thereof, a vertically movable supplemental plunger cooperating with said former when in blank-receiving position and having a yieldable presser for clamping the body area of the blank upon the former and having a wing pivotally connected thereto slightly beyond and overhanging said ledge and provided with means projecting therefrom intermediate of its width, means rigid with said supplemental plunger adapted upon clamping movement thereof to engage the means extending from said wing and to cause said wing to fold an intermediate portion of the blank upon the ledge, and means extending rearwardly from the ends of said wing for folding the tabs projecting from the intermediate portion of the blank alongside the body engaging portion of the former.

10. In a machine for making unitary covered boxes having a stepped former, means for successively placing blanks upon said former, vertically movable means for clamping said blanks upon the former, means for folding the blank upon the former to produce a fully assembled box, means for raising the clamping means well above the former, means for swinging the clamping means laterally, and means for removing the assembled box from the former comprising vertically and laterally movable suction means for disengaging the box from the former and moving it laterally therefrom in a predetermined arcuate path, means for relatively moving the bottom and cover portions of the box toward closed position during said predetermined movement, means for arresting the box at the end of said predetermined path to insure complete closure of the box, and means operable thereupon to release the suction to disengage the box from the suction means.

11. In a machine for making unitary covered boxes having a vertically movable blank-receiving plunger provided with a stepped former having upper and lower flat surfaces in parallel planes to receive the bottom and cover portions of the box with a ledge therebetween movable from blank-receiving position to setting-up position, a supplemental plunger having means for clamping the bottom and body portion of the blank upon the former and cooperating with the surface of said former when in blank-receiving position having means for bending a central portion of the blank about said ledge, and means for bending the tabs projecting from the central portion of the blank along the sides of the former, means for moving the former from blank-receiving position to setting-up position, means respectively cooperating with the former during the upward movement thereof and while in setting-up position to assemble the box, pneumatically operable means for removing the completed box from the former, and means for moving and positioning the supplemental plunger out of the path of the box in advance of and in properly timed relation to the operation of the box removing mechanism.

12. In a machine for making unitary covered boxes having a vertically movable blank-receiving plunger provided with a stepped former having upper and lower flat surfaces in parallel planes to receive the bottom and cover portions of the box with a ledge therebetween movable from blank-receiving position to setting-up position, a supplemental plunger having means for clamping the bottom and body portion of the blank upon the former and cooperating with the surface of said former when in blank-receiving position, having means for bending a central portion of the blank about said ledge, and means for bending the tabs projecting from the central portion of the blank along the sides of the former, means for moving the former from blank-receiving position to setting-up position, means respectively cooperating with the former during the upward movement thereof and while in setting-up position to assemble the box, pneumatically operable means for removing the completed box from the former in an arcuate path and means for swinging the supplemental plunger out of the arcuate path of the box in advance of and in properly timed relation to the operation of the box removing mechanism, and means for releasing the suction of said pneumatically operable means at the end of said arcuate path.

13. In a machine for making unitary covered boxes having a vertically movable lower plunger provided with a stepped former having flat surfaces in parallel planes with a ledge centrally therebetween movable from blank receiving position to setting-up position, a vertically movable spring actuated plunger having yieldable means for clamping the blank upon said former when in blank receiving position and means for bending a central portion of the blank about said ledge, means for moving the former from blank-receiving to setting-up position, means respectively cooperating with said former during said movement and while in setting-up position to assemble the box, pneumatically operable means for removing the completed box from the former, means for moving the supplemental plunger vertically and laterally out of the path of the box in advance of and in properly timed relation to the operation of the box removing mechanism, and means acting to close the box during and at the end of said movement.

14. In a machine for making unitary covered boxes having a vertically reciprocable plunger provided with a stepped former having upper and lower flat surfaces in parallel planes with a ledge therebetween and movable from blank-receiving position to set-up position, a pivotally mounted supplemental spring actuated normally vertical plunger cooperating with the opposed surface of said former when in receiving position and having means for bending the central panel of the blank about said ledge before the former is moved to setting-up position, means for moving said plungers and former vertically to setting-up position, means for continuing the movement of the supplemental plunger when the former reaches set-up position, means for moving said supplemental plunger laterally when it reaches the upper limit of its movement, means cooperating with said former during the upper movement thereof and while in setting-up position to assemble the box, pneumatically operable mechanism for removing the completed box from the former comprising a suction head adapted to engage the upper face of the cover portion of the box, means for applying suction to the suction head, means for moving the suction head and box engaged thereby in a predetermined path, a stop in the path of the box for arresting it at a predetermined point, and means for releasing suction from said suction head to discharge the box therefrom.

15. In a machine for making unitary covered boxes having a vertically movable plunger provided with a stepped former having flat surfaces in parallel planes to receive the bottom and cover portions of the blank with a ledge therebetween movable from blank-receiving position to setting-up position, a supplemental spring actuated plunger cooperating with the former when in blank receiving position to clamp the blank upon the bottom receiving surface of the former and having means for bending a central portion of the blank about said ledge and having means to bend end tabs projecting from said central portion along the sides of the bottom-receiving portion of the former, means for moving the former from blank receiving to setting-up position, means respectively cooperating with the former during the movement thereof and while in setting-up position to assemble the box, pneumatically operable mechanism for removing the completed box from the former comprising a vertically and laterally movable suction head adapted to engage the face of the cover portion of the box, means for applying suction to said head and continuing said suction during the vertical and lateral movements thereof, box closing means actuated in timed relation to the movement of said suction head to engage the bottom of the box, means for arresting the box at the end of said movement thereby to enable the box closing means to complete the closing of the box, and means for releasing suction upon said suction head to discharge the closed box.

16. In a machine for making unitary covered boxes having a vertically reciprocable lower plunger provided with a stepped former having upper and lower flat surfaces in parallel planes with a ledge therebetween and movable from lower blank-receiving position to set-up position, a pivotally mounted spring actuated normally vertical upper plunger cooperating with the upper surface of said former when in lowered position and having means for bending a portion of the blank about said ledge before the former is moved to set-up position, means for raising said upper plunger when the former reaches said set-up position, means for swinging the upper plunger laterally about its pivot when it reaches the upper limit of its movement, means cooperating with said former during the upward movement thereof and while in set-up position to assemble the box, pneumatically operable mechanism for removing the completed box from the former comprising a vertically swinging arm having a suction head adapted to engage the upper face of the cover portion of the box, means for actuating said swinging arm, means for arresting the same at a predetermined point, a stop in the path of the box for arresting the box at the end of said swinging movement, and means for closing said box comprising a lever having a bar and means for actuating said lever in properly timed relation to the arcuate movement of the box removing mechanism to engage the under surface of the bottom of the box and to close the box when arrested by said stop, and means operable thereupon to cut off the suction and thereby permit the closed box to drop.

HAROLD J. GOSS.

REFERENCES CITED

The following references are of record in the file of this patent:

UNITED STATES PATENTS

| Number | Name | Date |
|---|---|---|
| 1,959,235 | Goss | May 15, 1934 |
| 2,189,105 | Evans et al. | Feb. 6, 1940 |